United States Patent Office 3,466,367
Patented Sept. 9, 1969

3,466,367
PREPARATION OF GROWTH REGULATING COMPOSITIONS COMPRISING THYMUS EXTRACTS
Karl-Heinz Jaeger, Freiburg, Baden, and Hellmut Mittenzwei, Munich, Bavaria, Germany, assignors to Solco Basel AG, Birsfelden, Basel-Land, Switzerland, a corporation of Switzerland
No Drawing. Continuation of application Ser. No. 344,181, Feb. 12, 1964. This application Aug. 14, 1968, Ser. No. 754,106
Claims priority, application Germany, Apr. 27, 1954, J 8,578
Int. Cl. A61k 17/00
U.S. Cl. 424—95                                       8 Claims

ABSTRACT OF THE DISCLOSURE

Novel growth regulating compositions derived from the thymus of vertebrata, especially warm blooded animals, and to a novel process for the preparation of the said growth regulating compositions.

PRIOR APPLICATION

The present application is a continuation application of Ser. No. 344,181, filed Feb. 12, 1964, and a continuation-in-part application of our application Ser. No. 503,344, filed Apr. 22, 1955, both of which are now abandoned.

PRIOR ART

Tissue extracts which can be used therapeutically in the treatment of degenerative conditions, in cases of unsatisfactory cell regeneration, etc. are known. One way of preparing such extracts comprises wounding an animal by cutting, abrasion, penetrating or breaking the skin, cutting out the granulation tissue formed in the wounds after they have healed and extracting the granulation tissue. A variation of the process comprises cultivating on nutrient plasma the said granulation tissue and other kinds of connective tissue, injuring the resulting tissue cultures and extracting the said injured cultures.

Another modification of the known process comprises injecting the extracts of the granulation tissue into animals, withdrawing blood from the injected animals after a certain period of time and preparing a serum from the said blood. All these processes, however, are rather expensive and the yield of effective materials obtained thereby is quite small.

OBJECTS OF THE INVENTION

It is an object of the invention to provide novel growth regulating compositions derived from activated thymus.

It is another object of the invention to provide a novel process for the preparation of growth regulating compositions derived from activated thymus.

It is a further object of the invention to provide a novel method of regulating the growth of tissues.

These and other objects and advantages of the invention will become obvious from the following detailed description.

THE INVENTION

The novel growth regulating compositions of the invention are protein-free extracts derived from thymus glands of vertebrata, especially warm blooded animals, which have been activated or stimulated by irradiation or chemical stimulation and are in the form of aqueous solutions having 10 to 60 mg. of solids per ml. of solution. The said extracts are characterized by a high concentration of desoxyribosides and amino acids and by an ultraviolet absorption maximum in hydrochloric acid at 250 m$\mu$. They are further characterized by giving a negative Fehling's reaction and negative protein reactions with nitric caid (Heller's test) and with sulfosalicylic acid, and a positive ninhydrin reaction, Millon's reaction, xanthoprotein reaction and Molish reaction.

While the invention is not intended to be limited by any particular theory, the growth regulating compositions of the invention are believed to contain with other constituents hormones or hormone-like substances which promote or accelerate cell growth, cell metabolism and cell regeneration in cell deficient tissue and compounds formed in the organs which exert the same or similar functions as well as growth inhibiting compounds which have an antagonistic effect to the above mentioned hormones and hormone-like substances, respectively.

The stimulation or activation of the thymus glands of vertebrata may be effected by intravenous administration of a hypotonic solution of one or more of the chemical compounds defined below or by subjecting the said glands to irradiation. The amount of chemical stimulation or irradiation necessary to produce the desired effect can be easily determined by preliminary tests. The amounts of roentgen (R) needed to stimulate an organ (stimulating irradiation) is known and therefore it is possible to adjust the desired stimulation depending upon the type of irradiation. The dosages of the chemical stimulation or the irradiation must be below those dosages which cause irreparable damage to the organ and possible death of the vertebrata. These dosages are well known to those skilled in the art and can be obtained from many texts in the field.

Any type of irradiation which stimulates the thymus gland is suitable. Examples of suitable types are very short radium radiation, long wave, middle wave or short wave X-ray radiation, grenz ray radiation (Bucky rays), ultra-violet light, infra-red, longwave heat radiation, corpuscular ray radiation such as by canal rays, rapidly moving electrons, positrons, neutrons and similar elementary particles or particles derived from radioactive isotopes. Ultrasonic waves may also be used for stimulation. Irradiation has the advantage that it is possible to focus most type of waves to the specific part of the body to be treated and to concentrate the said rays upon a specific plane of the animal's body.

The chemical stimulants are hypotonic aqueous solutions which are injected intravenously into the animal. Examples of suitable solvents are distilled water or hypotonic solutions whose ion concentrations may be between zero and a value which still causes hemolysis in the animals.

Examples of suitable chemical stimulants are salts which in aqueous solution form ions such as sodium chloride, sodium phosphate, sodium sulfate, other buffer compounds, dispersed substances which will not be removed in the urine but will be stored in the reticuloendothelial system (RES) of the organism such as colloidal sulfur and india ink, dyestuffs particularly biologically active dyestuffs having a specific range of fluoroescence such as methylene blue, eosine, trypan red, trypan blue, porphyrine, etc. and therapeutically active compounds such as ethyl palmitate, phenol derivatives, benzoic acid derivatives such as the methyl p-hydroxybenzoate, p-amino benzene and hemolytically active substances such as saponins and polyethylene glycol esters of fatty acids. Radioactive elements and compounds such as radioactive cobalt, iodine or phosphorus may also be used as chemical stimulants but are preferably used as indicators for the above-mentioned chemical stimulants.

The process of the invention for the preparation of growth regulating compositions derived from activated thymus glands comprises (1) stimulating the thymus glands of vertebrata by irradiation or intravenous injections of hypotonic solutions, (2) comminuting the activated thymus glands, (3) extracting the comminuted thymus glands with aqueous solutions, (4) removing proteins from the aqueous thymus extract, (5) neutralizing the protein-free solution and subjecting it to dialysis with a membrane adapted to pass compounds having a molecular weight up to 4,500, (6) removing fatty materials from the inner dialysate and (7) concentrating the inner dialysate to a concentration of 10 to 60 mg. of solids per ml.

Stimulating the thymus glands of e.g. a calf by irradiation or intravenous injection of hypotonic solutions as referred to above results in a moderate hyperplasia of the thymus gland with an accompanying hypertrophia and hyperplasia of the rethiculum cells of the marrow zone of the thymus gland.

The extraction of the comminuted thymus glands may be effected with water but an aqueous solution of lower alkanols such as ethanol and/or butanol is preferred since the deproteination step is preferably effected by precipitation from 85% or higher alkanol solutions. The lower alkanols are easily removed after the deproteination by evaporation under vacuum at relatively low temperatures. Deproteination may also be effected by the addition of perchloric acid or trichloroacetic acid. The perchloric acid is removed by precipitation as potassium perchlorate which introduces inorganic ions in the solution of the final product. Fractionated deproteination with trichloroacetic acid gives somewhat lower yields since it is not as easily controlled as the use of lower alkanols.

The dialysis to decrease the amount of low molecular weight components having a weight below 4,500 is preferably effected at low temperatures of the order of about 2° C. using water or dilute lower alkanols such as 10% aqueous ethanol as the dialysis media. Cellophane tubes have been found to be particularly suitable as the dialysing material although other dialysis materials may be used.

If necessary the pH of the inner dialysate is adjusted to about 7 and the solution is filtered to remove any salts that may precipitate. The solution is then concentrated under vacuum at temperatures not above 30° C., i.e., 20–50° C. to a concentration of 10 to 60 mg. of solids per ml. of solution.

The removal of fatty material may be effected before or after the dialysis step and is effected by extraction with organic solvents such as ethyl ether to obtain clear aqueous solutions.

The concentrated thymus extract after concentration of the inner dialysate can be administered topically, intramuscularly or transcutaneously after sterile filtration. The thymus extracts are stable and may be stored for prolonged periods of time without suffering any loss of activity. However, if desired, a preservative such as phenol, cresol, etc., may be added. Preservatives to prevent a secondary infection of the solutions after opening of the container in which it is supplied may also be added.

The thymus extracts of the invention were tested on tadpoles of the frog *Xenopus laevis* Daudin. These tadpoles grew faster when to the water in which they were cultured the growth regulating compositions of the invention were added in a ratio of 1 cc. of extract to 1000 cc. of water.

This may be illustrated by the test results obtained and shown in the following table:

| Growth of tadpoles in mg./kg. after days | 5 | 13 | 20 | 25 |
|---|---|---|---|---|
| Controls (no extract added to the water) | 50 | 100 | 200 | 300 |
| 1 cc. of extract added to 1,000 cc. of water | 60 | 180 | 490 | 850 |

In 25 days of test the test animals achieved their maximum weight whereafter metamorphosis occurred. The animals used as controls achieved their maximum weight only in 50 days of test. In other words, the thymus extracts of the invention enhance the growth of tadpoles to such a degree that the tadpoles undergo metamorphosis at a much earlier time than the controls. When a thymus extract was obtained in the same manner as an extract of the invention but without stimulating the thymus gland as described above before the gland was comminuted and extracted and the extract was further processed, and the said extract was used in the above test, no growth increasing effect on the tadpoles was noted. The same was true for extracts obtained from other non-stimulated or non-activated organs. This shows that the effects obtained with a thymus extract of the invention are to be considered specific characteristics inherent in the latter extract.

A further test was carried out to show the effects the thymus extracts of the invention exert on the metabolic activity of thyroid glands.

Rats were given a subcuteneous tracer dose (10 μc.) of $^{131}I$ and killed 2, 5½, 24 and 48 hrs. later. The thyroid glands were dissected out and hydrolysed in 16% sodium hydroxide, and their activity was measured in a fluid scintillation counter. Concurrently, estimations were made of the serum protein-bound iodine (PBI) concentration and of the serum inorganic $^{131}I$. In addition to control animals, two series each of thirty-two animals were used; both short-term (8 days) and long-term (21 days) administrations of the thymic extract of the invention were employed. The results obtained were as follows.

(1) After administration of the thymic extract the uptake of $^{131}I$ by the thyroid gland was greatly increased. After a period of time of 24 and 48 hrs., respectively, the uptake of $^{131}I$ by the control animals amounted to 29 and 28 percent, respectively. In contrast thereto, with the animals treated with the thymus extracts of the invention this uptake of $^{131}I$, determined after identical periods of time, amounted to 62 and 50 percent, respectively.

(2) The increased storage of iodine by the thyroid was not accompanied by a rise in serum $^{131}I$ levels or by an increase in the serum protein-bound iodine (PBI) concentration as shown by the following table:

SERUM $^{131}I$ AND $^{131}PBI$ IN RATS TREATED WITH THYMIC EXTRACT (%/ML. AFTER 48 HRS.)

| | Untreated controls | Treated for 14 days | Treated for 5 days |
|---|---|---|---|
| Inorganic $^{131}I$ | 0.0165 | 0.0068 | 0.0134 |
| $^{131}PBI$ | 0.1217 | 0.1040 | 0.1169 |

The results obtained in rats indicate that the thymic extract of the invention increases the storage of iodine but also causes a marked decrease in hormone production by the thyroid.

In the following example there are described several preferred embodiments to illustrate the invention. However, it should be understood that the invention is not intended to be limited to the specific embodiments.

EXAMPLE

Healthy young calves weighing about 60 kg. received on the 14th, 12th and 10th day prior to slaughtering intravenous injections of 250 cc. of a 0.01% aqueous india ink solution which amounted to 5% of the amount of the circulating blood. After the animals were slaughtered the thymus was removed. The thymus glands of the calves exhibited hyperplasia with hypertrophy and hyperplasia of the reticulum cells in the marrow area. The quantitative ratio of marrow cells and cortical cells was altered in favor of the former.

10 kg. of the activated thymus glands were frozen and ground through a finely perforated disc in a meat grinder. The finely ground thymus glands were admixed with 65 liters of 70% aqueous ethanol and the mixture was stirred for two hours at 0° C. After standing overnight at 0° C., the clear supernatant liquor was siphoned off and the residue was centrifuged. Although it is not always necessary, the extracted thymus glands were comminuted again in the meat grinder and then were stirred for two hours with 40 liters of 60% aqueous ethanol at 0° C. After standing overnight at 0° C., the supernatant liquid was siphoned off and the residue was centrifuged. The comminuted thymus glands were extracted a third time in the same manner with 30 liters of 60% aqueous ethanol and the gland residue was discarded.

The three ethanol extracts were combined and brought to a total concentration of 85% by volume of ethanol by the addition of 95 to 100% ethanol which caused proteins to precipitate. The protein precipitate was removed by filtration and the clear filtrate was evaporated in a circulation evaporator to a final volume of 10 liters. 95 to 100% ethanol was added to the concentrated solution to readjust the ethanol content to 85% by volume. The resulting solution was allowed to stand at 0° C. for several hours during which additional inactive proteins precipitated and were later removed by filtration.

The resulting solution was again concentrated in vacuo to 10 liters and after cooling, the solution was shaken with 3 to 4 liters of ethyl ether to extract fatty material therefrom. The ether extract was separated and the concentration of the ethanol in the solution was again adjusted to 85% by volume. After filtering off the precipitated proteins, the clear solution was concentrated to a total volume of 5 liters, allowed to stand for several days at 0° C. and was then clarified by filtration through an asbestos filter. The resulting solution was free from protein.

The pH of the protein-free solution was adjusted to 7 and was dialyzed in a cellophane tube against an equal volume of 10% aqueous ethyl alcohol solution. The outer dialysate was removed and the dialysis was repeated against the same volume of 10% aqueous ethyl alcohol solution. The inner dialysate was then evaporated in vacuo to obtain 4 liters of solution having a concentration of 40 mg. of solids per ml. The said solution was filtered and filled into 5 cc. ampules under sterile conditions.

The said solution was characterized by a high content of desoxyribosides and amino acids and in hydrochloric acid solutions under ultraviolet light, it has a maximum at 250 m$\mu$. The product had a negative reaction in Heller's test and the sulfosalicylic acid test showing the lack of proteins and exhibited a positive reaction in the glucose oxydase test, Molish test, xanthoprotein test, Millon's test and ninhydrin test. The dry product had an average molecular weight of 4,500.

What is claimed is:

1. A process for the preparation of growth regulating compositions derived from activated thymus glands which comprises recovering the thymus glands of vertebrata selected from the group consisting of vertebrata whose thymus gland has been exposed to a stimulating dose of irradiation below the dose which irreparably damages the organ and vertebrata which have received intravenous injections of hypotonic aqueous solutions of a chemical stimulant, comminuting the said thymus glands, extracting the comminuted thymus glands with an aqueous solution, precipitating proteins from the aqueous extract by the addition thereto of a member selected from the group consisting of lower alkanols, perchloric acid and trichloroacetic acid, neutralizing the protein-free solution and subjecting it to dialysis with a membrane adapted to pass compounds having a molecular weight up to 4,500, extracting fatty material from the resulting inner dialysate with an organic solvent to obtain a clear aqueous solution and concentrating the resulting aqueous inner dialysate solution to a concentration of 10 to 60 mg. of solid per milliliter of solution.

2. The process of claim 1 wherein the comminuted thymus glands are extracted with up to 70% aqueous ethyl alcohol.

3. The process of claim 1 wherein the proteins are removed by precipitation from at least 85% aqueous ethyl alcohol.

4. The process of claim 1 wherein the dialysis is effected against distilled water.

5. The process of claim 1 wherein the dialysis is effected against dilute aqueous ethyl alcohol.

6. The process of claim 1 wherein the fatty material is removed by extraction with an organic solvent.

7. An activated thymus extract produced by the process of claim 1.

8. A process for the preparation of growth regulating compositions derived from activated thymus glands which comprises recovering the thymus glands of calves selected from the group consisting of calves whose thymus glands have been subjected to stimulating irridiation below the dose which irreparably damages the thymus gland and calves who have received intravenous injections of hypotonic aqueous solutions of a chemical stimulant, comminuting the thymus glands, extracting the comminuted thymus glands with aqueous ethyl alcohol having a concentration up to 70%, precipitating proteins from the said extracts by adjusting the ethyl alcohol concentration to at least 85%, extracting the protein-free solutions with a lower alkyl ether to remove fatty substances, subjecting the resulting solution to dialysis with a cellophane membrane against an equal volume of 10% aqueous ethyl alcohol solution and concentrating the inner dialysate to a concentration of 10 to 60 mg. of solids per ml.

References Cited
UNITED STATES PATENTS 2,239,345    4/1941    Sperti _____ 424—95

ALBERT T. MEYERS, Primary Examiner

S. J. FRIEDMAN, Assistant Examiner